(12) United States Patent
McCarty

(10) Patent No.: US 9,041,549 B2
(45) Date of Patent: May 26, 2015

(54) REMOTELY READABLE VALVE POSITION INDICATORS

(75) Inventor: Michael Wildie McCarty, Marshalltown, IA (US)

(73) Assignee: Fisher Controls International, LLC, Marshalltown, IA (US)

(*) Notice: Subject to any disclaimer, the term of this patent is extended or adjusted under 35 U.S.C. 154(b) by 286 days.

(21) Appl. No.: 13/604,326

(22) Filed: Sep. 5, 2012

(65) Prior Publication Data

US 2012/0326885 A1 Dec. 27, 2012

Related U.S. Application Data

(63) Continuation of application No. 12/268,934, filed on Nov. 11, 2008, now Pat. No. 8,272,281.

(51) Int. Cl.
*F16K 37/00* (2006.01)

(52) U.S. Cl.
CPC ............. *F16K 37/00* (2013.01); *F16K 37/0083* (2013.01); *F16K 37/0075* (2013.01); *F16K 37/0041* (2013.01)

(58) Field of Classification Search
CPC . F16K 37/00; F16K 37/0041; F16K 37/0075; F16K 37/0083
USPC .......... 340/870.02, 686.3; 73/865.9; 116/277; 137/553
See application file for complete search history.

(56) References Cited

U.S. PATENT DOCUMENTS

| | | | |
|---|---|---|---|
| 3,994,255 A * | 11/1976 | Thompson | 251/356 |
| 4,494,565 A | 1/1985 | Sinclair et al. | |
| 5,056,046 A | 10/1991 | Mutchler et al. | |
| 6,561,517 B2 * | 5/2003 | James | 277/511 |
| 2002/0157713 A1 * | 10/2002 | Pimouguet | 137/554 |
| 2003/0079670 A1 * | 5/2003 | Kerger et al. | 116/277 |
| 2005/0087235 A1 * | 4/2005 | Skorpik et al. | 137/554 |

(Continued)

FOREIGN PATENT DOCUMENTS

| | | |
|---|---|---|
| GB | 2328839 | 3/1999 |
| JP | 60164085 | 8/1985 |

(Continued)

OTHER PUBLICATIONS

International Searching Authority, "Search Report and Written Opinion," issued in connection with International Application No. PCT/US2009/058036, mailed on Dec. 10, 2009, 12 pages.

(Continued)

*Primary Examiner* — Andrew Bee
(74) *Attorney, Agent, or Firm* — Hanley, Flight & Zimmerman, LLC

(57) ABSTRACT

Remotely readable valve position indicators and related methods are described. An example apparatus in accordance with the teachings of this disclosure includes a valve body, a valve stem and a fluid flow control apparatus coupled to the valve stem. The fluid flow control apparatus is longitudinally displaceable between a first position and a second position to control fluid flow through a flow aperture of the valve body. The apparatus also includes a valve position indicator including an identifier device coupled to the valve stem. In the first position, the wireless identifier device associated with a first value indicative of the first position of the fluid flow control apparatus. In the second position, the wireless identifier device associated with a second value indicative of the second position of the fluid flow control apparatus.

25 Claims, 9 Drawing Sheets

(56) References Cited

U.S. PATENT DOCUMENTS

| | | | |
|---|---|---|---|
| 2009/0107348 A1* | 4/2009 | Noonan et al. | 100/8 |
| 2010/0116365 A1 | 5/2010 | McCarty | |

FOREIGN PATENT DOCUMENTS

| | | | |
|---|---|---|---|
| JP | 2006-189130 A | * | 7/2006 |
| JP | 2006189130 | | 7/2006 |
| JP | 2007127234 | | 5/2007 |
| WO | 9117514 | | 11/1991 |

OTHER PUBLICATIONS

"IP4 Portable Rfid Reader (UHF)," Product Profile, Intermec Technologies Corporation, 2007, 2 pages.

"Synometrix Integrated Technologies—SynoTag Passive," http://www.synometrix.com/RFID_waterproof_tokens_specifications.shtml (Last accessed on Aug. 5, 2008).

"Synometrix Integrated Technologies—Industrial Hand Helds," http://www.synometrix.com/mobile_data_terminals.shtml (Last accessed on Aug. 5, 2008).

United States Patent and Trademark Office, "Notice of Allowance," issued in connection with U.S. Appl. No. 12/268,934, mailed on May 25, 2012, 20 pages.

United States Patent and Trademark Office, "Final Office Action," issued in connection with U.S. Appl. No. 12/268,934, mailed on Dec. 9, 2011, 57 pages.

United States Patent and Trademark Office, "Non-Final Office Action," issued in connection with U.S. Appl. No. 12/268,934, mailed on Jun. 23, 2011, 33 pages.

United States Patent and Trademark Office, "Advisory Action," issued in connection with U.S. Appl. No. 12/268,934, mailed on Mar. 28, 2012, 4 pages.

International Searching Authority, "International Search Report", issued in connection with PCT Application No. PCT/US2013/057906, mailed on Dec. 11, 2013, 2 pages.

* cited by examiner

| Reader Output | Valve Position | Diagnostic |
|---|---|---|
| ABCD | Open | Ok |
| ACD | Open | Stem Container Needs Maintenance |
| ABD | Open | Shielding Body Needs Maintenance |
| ABC | Open | Shielding Body Needs Maintenance |
| AD | Open | Stem Container & Shielding Body Needs Maintenance |
| AC | Open | Stem Container & Shielding Body Needs Maintenance |
| AB | Open | Shielding Body Needs Maintenance |
| A | Open | Stem Container & Shielding Body Needs Maintenance |
| BCD | Open | Stem Container Needs Maintenance |
| BD | Open | Stem Container & Shielding Body Needs Maintenance |
| BC | Open | Stem Container & Shielding Body Needs Maintenance |
| B | Open | Stem Container & Shielding Body Needs Maintenance |
| CD | Closed | Ok |
| C | Closed | Shielding Body Needs Maintenance |
| D | Closed | Shielding Body Needs Maintenance |
| ∅ | Unknown | System Needs Maintenance |

FIG. 6

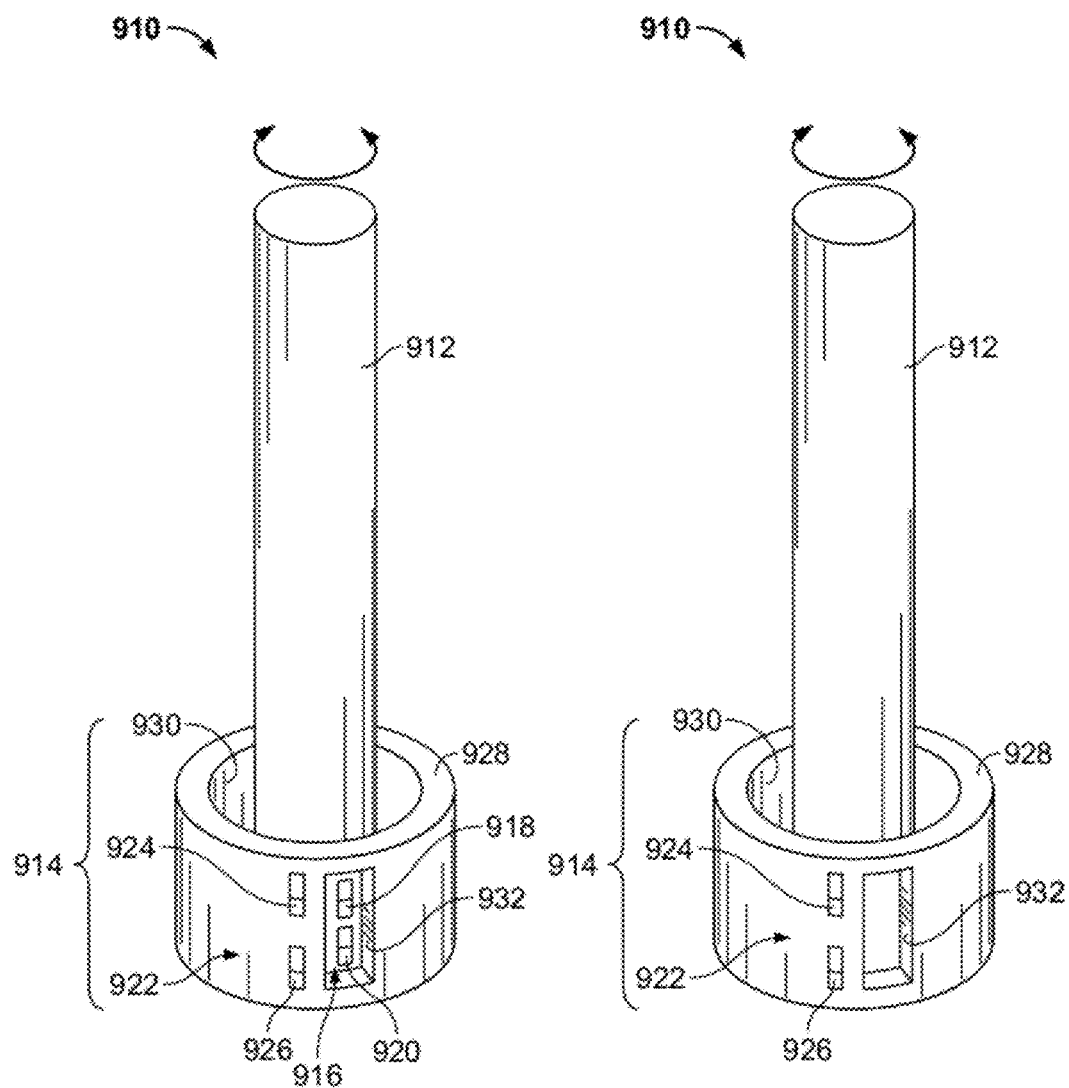

REMOTELY READABLE VALVE POSITION INDICATORS

This patent arises from a continuation of U.S. patent application Ser. No. 12/268,934, filed on Nov. 11, 2008, which is hereby incorporated herein by reference in its entirety.

FIELD OF THE DISCLOSURE

1. Field of the Disclosure

The present disclosure relates generally to valves having a valve stem or shaft movable for flow rate adjustment and, more particularly, to remotely readable valve position indicators coupled to a valve stem or shaft.

2. Background

Typically, a valve includes a fluid inlet passage coupled through an orifice to a fluid outlet passage and a fluid flow control or closure member operative relative to the orifice to control the amount of fluid flow through the valve. The closure member may include a valve plug having a surface that may engage a valve seat surrounding the orifice to prevent the flow of fluid through the valve.

A process control plant can contain hundreds to thousands of valves throughout the plant, many of which may be manually operated valves. Such manually operated valves are used for many different purposes including, for example, isolating equipment, draining vessels, flushing piping, bypassing equipment, etc. During operation of the plant, these valves must be in the proper position (i.e., either open or closed) for the plant to operate effectively and safely.

Before the start up of a plant or a portion of the plant (e.g., a single loop) the position of each manually operated valve must be validated. Typically, this requires sending a person into the plant with a list of valves that are to be verified and visually inspecting the positions of the valves. This is very time consuming, risks human error and exposes the person to potential safety hazards.

SUMMARY

An example apparatus in accordance with the teachings of this disclosure includes a valve body, a valve stem and a valve position indicator. The valve position indicator includes a wireless identifier device coupled to a stem container through which the valve stem passes. The wireless identifier device to move with the valve stem. The wireless identifier device is to convey information indicative of the position of the valve stem to a remote wireless electronic reader. The valve position indicator also includes a shielding body to prevent the wireless identifier device from conveying the information to the remote wireless electronic reader when the valve stem is in a first position and to permit the wireless identifier device to convey the information to the remote wireless electronic reader when the valve stem is in a second position.

Another example apparatus in accordance with the teachings of this disclosure includes a valve body, a valve stem and a valve position indicator. The valve position indicator includes a wireless identifier device directly coupled to the valve stem to move with the valve stem. The wireless identifier device is to convey information indicative of the position of the valve stem to a remote wireless electronic reader. The valve position indicator also includes a shielding body to prevent the wireless identifier device from conveying the information to the remote wireless electronic reader when the valve stem is in a first position and to permit the wireless identifier device to convey the information to the remote wireless electronic reader when the valve stem is in a second position.

An example apparatus in accordance with the teachings of this disclosure includes a valve body, a valve stem and a fluid flow control apparatus coupled to the valve stem. The fluid flow control apparatus is displaceable between a first position and a second position to control fluid flow through a flow aperture of the valve body. The apparatus also includes a valve position indicator coupled to the valve stem. The valve position indicator is to provide a first value associated with a first position of the fluid flow control apparatus and to provide a second value associated with a second position of the fluid flow control apparatus.

BRIEF DESCRIPTION OF THE DRAWINGS

FIG. 6 is a table detailing example output readings for the example system of FIG. 3 and the example method of FIG. 5.

FIG. 9 depicts another example valve position indicator configuration coupled to a valve in an open position.

FIG. 10 depicts the example valve position indicator of FIG. 9 in a closed position.

DETAILED DESCRIPTION

Figures 1, 2:
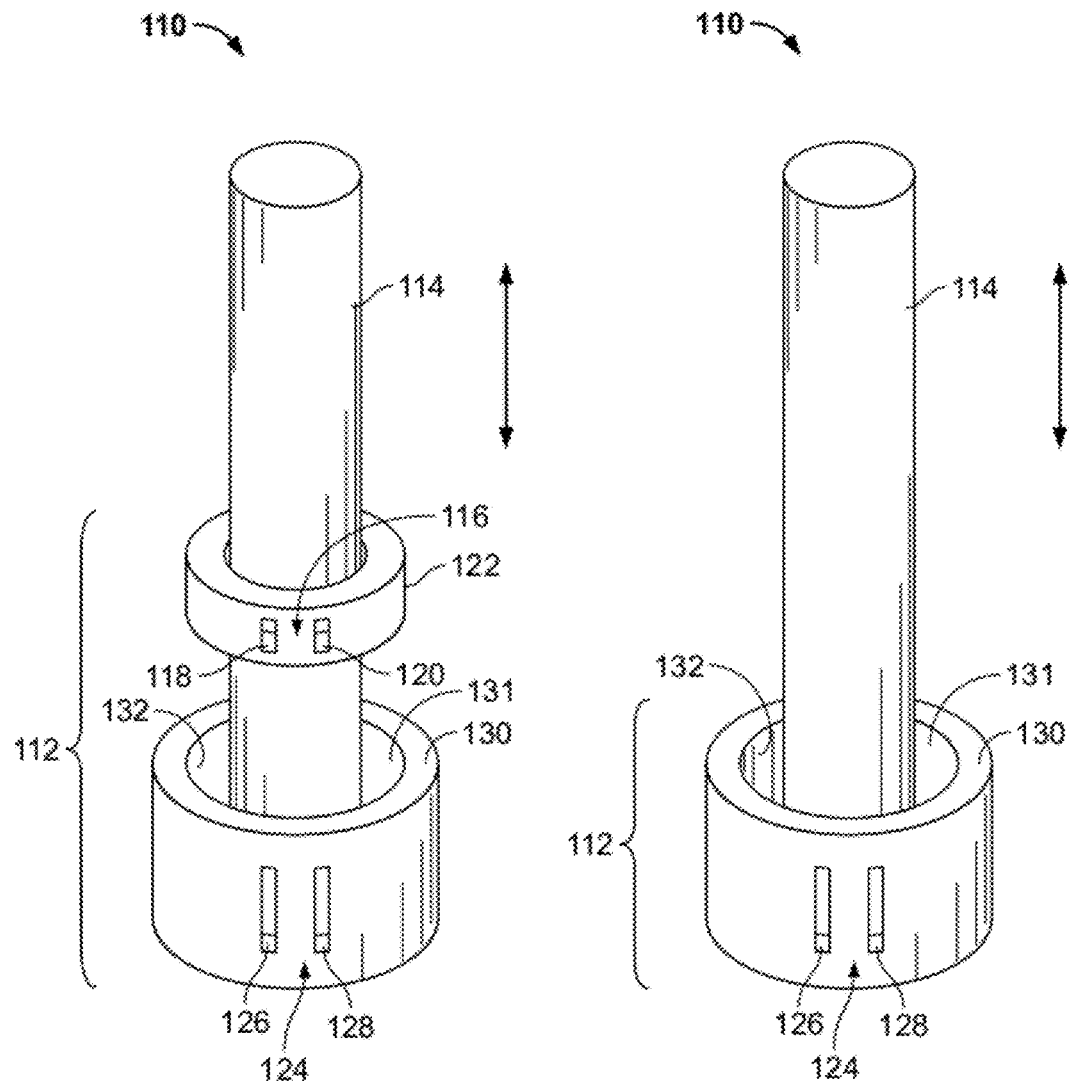
FIG. 1 depicts a portion of an example valve in an open position and including an example valve position indicator.
FIG. 2 depicts the example valve of FIG. 1 in a closed position.

With the example valve position indicators described herein, a person (e.g., a technician, operator or any other service person) in a process control plant can remotely obtain readings from valves in the plant to obtain information about the positions of the valves (i.e., whether the valves are in an open position, a closed position or a position therebetween) without requiring the time consuming visual inspection of the precise physical position of each valve. With the examples described herein, the person can aim a handheld tool (e.g., a wireless reader device) at a valve from a distance of up to several meters and automatically gather information from one or more position indicators coupled to the valve.

In one example described herein, a first set of wireless identifier (ID) devices or tags is coupled (e.g., glued, welded or otherwise mechanically and/or chemically fixed) to a tag carrier or stem container and/or directly to a valve stem or shaft, and a second set of wireless ID tags is coupled to a shielding body through which the valve stem passes. In operation, when the valve stem moves, one or more of the wireless ID tags may move inside and become obscured or shielded (e.g., visually, electromagnetically, etc.) by the shielding body, thereby preventing those obscured or shielded wireless ID tags from being read or otherwise conveying information to a remote handheld reader device.

In this manner, the position of a valve stem can be associated with the presence or absence of information being conveyed to a reader device from one or more of the wireless ID tags. For example, a valve open condition may correspond to a valve stem position that results in all of the wireless ID tags on the valve stem being outside of the inner portion of the shielding body so that all of the wireless ID tags can be read by (i.e., can convey information to) a remotely operated handheld reader device. In other words, when the handheld reader receives identification information from all of the wireless ID tags on the valve stem, a valve open condition is recognized. Conversely, a valve closed condition may correspond to a valve stem position at which some of the wireless ID tags are shielded by the shielding body. In this position, only some of the wireless ID tags can be read by the handheld reader device. Thus, a valve closed condition is recognized when only a portion of the wireless ID tags conveys information to the reader device.

The wireless ID tags may be arranged on a valve stem to enable remote reading (e.g., via a handheld reader) of open and closed valve positions as well as throttling or control positions between open and closed. For example, in some of the examples described herein, there may be a plurality of longitudinally displaced rows of wireless ID tags along the valve stem. Thus, varying the position of the valve stem with respect to the shielding body exposes a varying number of rows of tags. In operation, when the valve is in the closed position, all of the rows of tags on the valve may be nested within or disposed inside the shielding body and rendered unreadable. As the valve opens, the valve stem moves to cause some of the rows of tags to become unshielded as they move outside the shielding body. In this manner, the number of rows of wireless ID tags that are unshielded and, thus, readable indicates the position of the valve stem. For example, if none of the rows is readable, the valve may be considered closed, if half of the total rows are readable, the valve may be considered half open, and if all of the rows are readable, the valve may be considered to be fully open.

In other examples described herein, the shielding body may be eliminated and the handheld reader may be configured to include a focused antenna system or other narrowly focused reading element to enable remote reading (or interrogation) of individual wireless ID tags. For example, the wireless ID tags may be spaced along the longitudinal axis of a valve stem and the handheld reading device may be pointed or aimed at one or more of the wireless ID tags to determine the position of the stem (e.g., the percentage stroked). In other words, in these examples, the handheld reader and wireless ID tags are configured to enable selective or individual reading or interrogation of the wireless ID tags.

The example valve position indicators described herein may also be used to remotely determine the position of a rotary valve shaft. For example, in some of the examples described herein, a first set of wireless ID tags is coupled to a carrier and/or directly to a valve shaft, and a second set of wireless ID tags is coupled to a shielding body. The first set of wireless ID tags is disposed behind the shielding body, and the shielding body includes an opening through which the first set of wireless ID tags may be exposed when the first set of wireless ID tags is opposite the opening, depending on the rotation of the valve shaft. Thus, varying the rotation of the valve shaft with respect to the shielding body exposes or shields the first set of wireless ID tags. In operation, when the valve is in the closed position, the first set of wireless ID tags is disposed behind the shield (i.e., not opposite the opening and, thus, not readable). When the valve shaft rotates to open the valve, the first set of wireless ID tags becomes visible in the opening and, thus, readable. In other examples, the position of the wireless ID tags may be reversed such that when the wireless ID tags are visible in the opening, the valve is closed, and when the wireless ID tags are not visible in the opening the valve is open or partially open.

Regardless of whether the valve position indicators described herein are used with a sliding stem valve or a rotary valve, multiple wireless ID tags may be used to provide redundancy. The use of redundant wireless ID tags ensures that a technician, operator or other person can determine the position of the valve even if one tag on a valve stem or shaft becomes inoperative. In addition, failure of one or a plurality of redundant wireless ID tags provides notification that the wireless ID tags on the valve need maintenance.

Additionally, the wireless ID tags may provide a redundant position indication (e.g., a percentage stroked such as 25%, 50%, 75%, etc.) that can be compared to, for example, a position value obtained from a feedback sensor, which may be part of the valve control apparatus. In this manner, a field technician or other person can use a handheld reader device to obtain the position value from the feedback sensor of a particular valve and the position indication provided by the wireless ID tags associated with the particular valve. A comparison of the position indications obtained from the feedback sensor and the wireless ID tags may indicate whether a problem exists (e.g., if the position values are substantially different). Typically, the resolution of the position indication provided by the wireless ID tags is significantly lower than that provided by the feedback sensor. As a result, a gross comparison of the position values may be performed to detect only significant potential operational problems. For example, if the feedback sensor indicates that a valve is 50% open, but the wireless ID tags provide information indicating that the valve is 100% open, then a problem may exist and should be investigated.

The handheld reading device used by the operator may also be used to read other tags on valves to gather additional information other than position information. Example additional information includes valve maintenance history, valve shipment information, installation information, valve make and model, recommended spare parts, contact information or maintenance procedures. This additional information may be used to facilitate review and maintenance of the valve by eliminating the need for a person to manually enter this information.

Referring now to the figures, FIG. 1 depicts a portion of an example valve assembly 110 that includes an example position indicator 112. The example valve assembly 110 includes a valve stem 114 that is coupled to a plug (see FIG. 12). A first set of tags or identifier devices 116 includes a first tag or identifier device 118 and a second tag or identifier device 120, both of which are coupled to the valve stem 114. In this example, the first set of identifier devices 116 is coupled to the valve stem 114 via a stem container 122, which is depicted as a ring-shaped or cylindrical body through which the stem 114 passes. In other examples, the first set of identifier devices 116 may instead be coupled directly to the valve stem 114. The example position indicator 112 also includes a second set of identifier devices 124 that includes a third identifier device 126 and a fourth identifier device 128. The second set of identifier devices 124 is coupled to a base container or shielding body 130. In this example, the shielding body 130 is stationary while the stem container 122 is movable relative thereto. Additionally, the shielding body 130 may be a separate component or, alternatively, may be integral to a valve body (not shown). Further, the shielding body 130 may be made of metal or, in the case where the shielding body 130 is a separate component, the shielding body 130 may be made of any other suitable material. Furthermore, the shielding body 130 is shown as a cylindrical body that has a bore 131 to receive the valve stem 114. The stem container 122 is also nestable within the bore 131, as discussed below.

The identifier devices 118, 120, 126 and 128 may provide any suitable type of visible, perceptible, signal generating identification device(s) such as, for example, radio frequency identification (RFID) tags, light emitting diodes (LEDs), labels, bar codes, electromagnetic devices, transponders, near field communication devices, etc. In addition, in the example shown, the identifier devices 118, 120, 126 and 128 are coupled to the outer diameters of the stem container 122 and the shielding body 130 via any suitable mechanical or chemical fastener. In other examples, the identifier devices 118, 120, 126 and 128 may be embedded in the stem container 122 and/or the shielding body 130.

FIG. 1 shows the example valve 110 in an open position, at which a plug or other fluid control member coupled to the stem 114 does not engage a valve seat (see FIG. 21) so that a fluid may flow from a fluid inlet through the valve 110 to a fluid outlet. FIG. 2 shows the example valve 110 in a closed position, at which the plug engages the valve seat 1216 and prevents fluid from flowing therethrough. In the closed position, the valve stem 114 moves downward (in the orientation shown in FIGS. 1 and 2) and the stem container 122 and the first set of identifier devices 116 move inside and become surrounded by the shielding body 130, thereby preventing information (e.g., an ID) from being conveyed (e.g., electromagnetically or optically transmitted, read, etc.) to a remote reader device via the identifier devices 116.

An inner diameter 132 of the shielding body 130 forms a shield or has a shielding device coupled to at least a portion of the inner diameter 132 to prevent reading or otherwise obtaining information from or communicating with the first set of identifier devices 116. For example, in those examples in which the identifier devices 118, 120, 124 and 126 are radio frequency ID (RFID) tags, the inner diameter 132 may be a layer of metal that substantially impedes the electromagnetic radio signals sent thereby and, thus, renders the identifier devices 118 and 120 unreadable or otherwise unable to convey information. However, the second set of identifier devices 124 is coupled to the outer diameter of the shielding body 130 and, thus, is not shielded or prevented from conveying information to a remote reader device. Therefore (to the extent maintenance is not required as detailed herein) the second set of identifier devices 124 remains readable.

To determine the position of a valve, an operator aims or points a reading device, which is described in greater detail below, in the direction of the valve 110 to obtain an indication of the presence or absence (e.g. readability or perceptibility) of the identifier devices 118, 120, 126 and 128. The various combinations of the presence or absence of each of the four identifier devices 118, 120, 126 and 128 provides information regarding the position of the valve 110 and/or any maintenance needs associated with the operation of the identifier devices 118, 120, 126 and 128. If the reading indicates that the identifier devices 118, 120, 126 and 128 are present (and are, therefore, able to communicate identifier information to the reading device), a person may be provided with an indication that the valve 110 is fully open and that each of the identifier devices 118, 120, 126 and 128 is in good operating condition. On the other hand, if only the second set of identifier devices 124 is detectable, the person may be provided with an indication that the valve 110 is closed and that the second set of identifier devices 124 is in good operating condition.

Further, if only one of the first set of identifier devices 116 and both of the second set of identifier devices 124 are present, then the valve 110 is indicated as open and the stem container 122 needs maintenance (e.g., one of the first set of identifier devices 116 coupled to the stem container 122 needs service). Similarly, if both of the first set of identifier devices 116 and one or none of the second set of identifier devices 124 is present, then the valve 110 is open and the shielding body 130 needs maintenance (e.g., one of the identifier devices coupled to the shielding body 130 needs service). Also, if only one of the first set of identifier devices 116 and one or none of the second set of identifier devices 124 is present, then the valve 110 is open and both the stem container 122 and the shielding body 130 need maintenance. Additionally, if only one of the second set of identifier devices 124 is present, then the valve 110 is closed and the shielding body 130 needs maintenance. Finally, if none of the identifier devices 118, 120, 126 and 128 is present, then either the position indicator 112 is not being read correctly or maintenance is required.

The indication that maintenance is required may suggest that the stem container 122 or the shielding body 130 need to be replaced with a stem container 122 or shielding body 130 having identifier devices that are operating properly. Alternatively, any of the identifier devices 118, 120, 126 and 128 may be individually replaced, repaired, adjusted or otherwise serviced. Because the identifier devices 118, 120, 126 and 128 have a finite life, the use of a plurality of identifier devices significantly increases the likelihood that a person (e.g., a service technician) will be able to remotely determine the position of the valve using a remote reader device. For example, if one identifier device on the valve stem 114 fails to operate as needed, another identifier device on the valve stem 114 can be read to continue to provide an indication of the valve position. In addition, the absence of the second valve stem identifier device (i.e., the failure of the second valve stem identifier device to convey information to a reader) may indicate that maintenance of the stem container 122 and its identifier devices is needed.

The use of multiple identifier devices on the shielding body 130 provides the same type of redundant indication for the base 130. Thus, the various combinations of presence/absence of the identifier devices 118, 120, 126 and 128 provide redundancy in the examples described herein, which provides adequate notice of the failure of any of the identifier devices. This redundancy significantly decreases the likelihood of a situation arising in which the position of the valve 110 is indeterminate because most or all of the identifier devices 118, 120, 126 and 128 simultaneously need maintenance.

Figure 3:
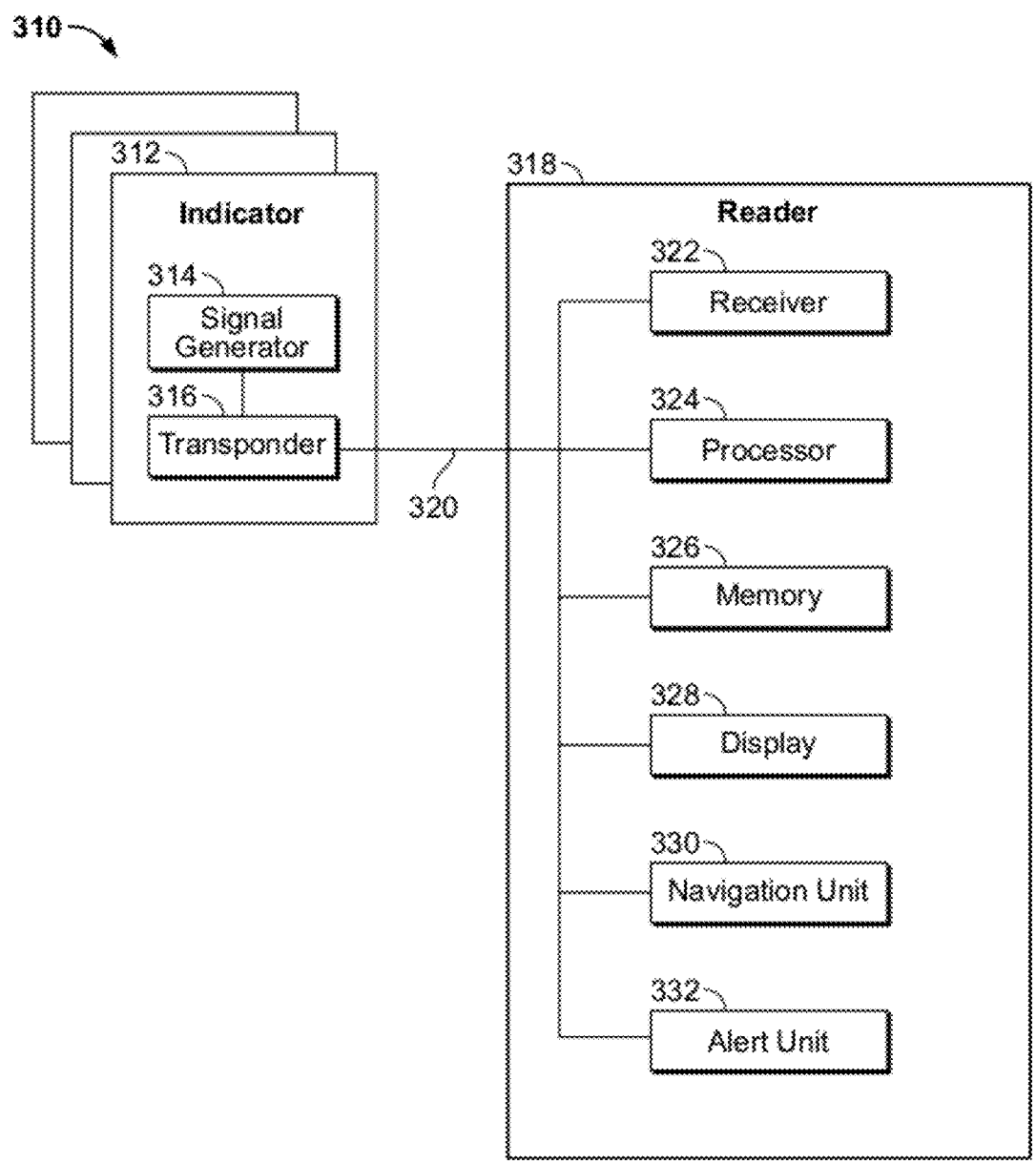
FIG. 3 is a detailed block diagram of an example valve position indicator system.

FIG. 3 is an example implementation of an example position indication system 310 that may be used to remotely determine a valve position and gather identification information and which may incorporate any of the identifier devices or a reader device described herein. The example position indication system 310 includes one or more position indicators 312, which may be implemented as one or more of the above-described identifier devices. The example indicator 312 includes a signal generator 314 and a transceiver or transponder 316. In this example, the signal generator 314 may provide a signal containing an identifying code that uniquely corresponds to the indicator 312. As noted above and described in more detail below, a handheld reader device (e.g., a reader device 318) may be used to receive signals from one or more wireless identifier devices coupled to a valve, extract the unique identifier code(s) from the signal(s) and analyze the combination of unique identifier codes received (e.g., the presence or absence of the codes) to determine the position of the valve. The transponder 316, in this example, may include an antenna to transmit the signal generated by the signal generator 314. In some examples, the indicator 312 may include its own power source (e.g., a battery) or may be supplied power from the device to which the valve 110 is coupled and/or may receive power via a signal sent by a reader device (e.g., the reader 318). Thus, in those examples in which the indicator 312 uses RFID technology, the indicator 312 may be a passive, semi-passive or an active RFID tag.

In those examples in which the indicator 312 implements near field communication and/or passive RFID technology, the power signal is received from the reader device, as noted above. In some examples, the shielding body (e.g., the shielding body 130 of FIG. 1) blocks or impedes the receipt of activation, i.e., power, signals from the reader device so that the indicator 312 is not activated and does not convey information to the reader device.

The example position indication system 310 also includes the reader 318, which is communicatively coupled to the indicator 312 via a communication channel or link 320. In this example, the communication channel 320 is a wireless communication channel. In other examples, the communication channel 320 may be a wire or cable that extends from the reader 318 and plugs into the indicator 312, or vice versa, and carries one or more analog and/or digital signal(s). In addition, the communication channel 320 may be a multi-drop connection coupling the reader 318 to a plurality of indicators 312, or the communication channel 320 may be a point-to-point connection, etc.

In the example of FIG. 3, the reader 318 includes a receiver 322 to gather data such as, for example, identification information, valve position information and/or maintenance information from the indicator(s) 312. The receiver 322 may include an antenna (see e.g., FIG. 12) to send signals and/or power to the indicator 312 and to gather signals that are wirelessly transmitted from the indicator 312. In this example, the receiver 322 can gather data from the indicator 312 up to a distance of about, for example, several meters.

To control the various operations of the position indication system 310, the position indication system 310 is provided with a processor 324. In an example implementation, the processor 324 can be implemented using a microprocessor or a microcontroller. The processor 324 communicates instructions or commands to other portions of the position indication system 310 to control the operations of those portions.

To store data such as, for example, identification information, valve position information and/or maintenance information, the example reader 318 includes a memory 326. The memory 326 may include an internal database including any desired type of volatile and/or non-volatile memory such as, for example, static random access memory ("SRAM"), dynamic random access memory ("DRAM"), flash memory, read-only memory ("ROM"), etc. The memory 326 may include any desired type of mass storage device including hard disk drives, optical drives, tape storage devices, etc. In addition, in some examples, the memory 326 may be or include a pluggable external storage device such as, for example, a CD-ROM, a USB memory stick, a magnetic disk, etc. The information stored in the memory 326 may be retrieved for later use by an operator and/or displayed via the reader 318 for immediate use. In addition, the memory 326 can store information about the location of one or more valves including, for example, a map of the location of a plurality of valves in a process control system, which can be used to locate any valves in need of reading and/or testing.

To display information received from the indicator 312 and/or stored in the memory 326, the example position indication system 310 includes a display 328. The display 328 may provide any type of visual presentation (e.g., a liquid crystal display (LCD), a cathode ray tube (CRT) display, etc.), audio presentation, or other presentation including vibrations, etc. The display 328 presents the information to an operator to provide the operator the necessary knowledge to take the appropriate action (e.g., open a closed valve, close an open valve, service a valve in need of maintenance, etc.).

In some examples, the reader 318 may include a navigation unit 330 such, as for example, a unit compatible with the Global Positioning System (GPS). The navigation unit 330 can provide real time location information and directions to an operator to direct the operator to one or more valves in a process control system for testing and/or reading. Details of a process control system and the valves contained therein may be stored in the memory 326 as noted above. Further, the navigation unit 330 may determine the proximity of valves that have not yet been tested and/or read. In such a configuration, if the operator is near a valve to be read, but the operator begins to move further away from the valve, the navigation unit 330 detects the increasing distance. The reader 318 can then alert the operator of the nearby valves that are about to be missed. These notifications can increase the efficiency to survey all the valves in a process control system.

To alert the operator of valves and/or indicator(s) 312 that have not yet been tested and/or read and which, according to the navigation unit 330, the operator may miss, the example position indication system 310 includes an alert unit 332. The alert unit 332 outputs any suitable notification including, for example, an audio alarm via a speaker, flashing light(s) via the display or other light source, a vibration, etc.

While an example manner of implementing the system 310 has been illustrated in FIG. 3, one or more of the elements, processes and/or devices illustrated in FIG. 3 may be combined, divided, re-arranged, omitted, eliminated and/or implemented in any other way. Further, the example indicator 312, the example signal generator 314, the example transponder 316, the example communication channel 320, the example reader 318, the example receiver 322, the example processor 324, the example memory 326, the example display 328, the example navigation unit 330, example alert unit 332 and/or, more generally, the example system 310 of FIG. 3 may be implemented by hardware, software, firmware and/or any combination of hardware, software and/or firmware. Thus, for example, any of the example indicator 312, the example signal generator 314, the example transponder 316, the example communication channel 320, the example reader 318, the example receiver 322, the example processor 324, the example memory 326, the example display 328, the example navigation unit 330, example alert unit 332 and/or, more generally, the example system 310 could be implemented by one or more circuit(s), programmable processor(s), application specific integrated circuit(s) (ASIC(s)), programmable logic device(s) (PLD(s)) and/or field programmable logic device(s) (FPLD(s)), etc. Further, the example system 310 of FIG. 3 may include one or more elements, processes and/or devices in addition to, or instead of, those illustrated in FIG. 3, and/or may include more than one of any or all of the illustrated elements, processes and devices.

Figure 4:
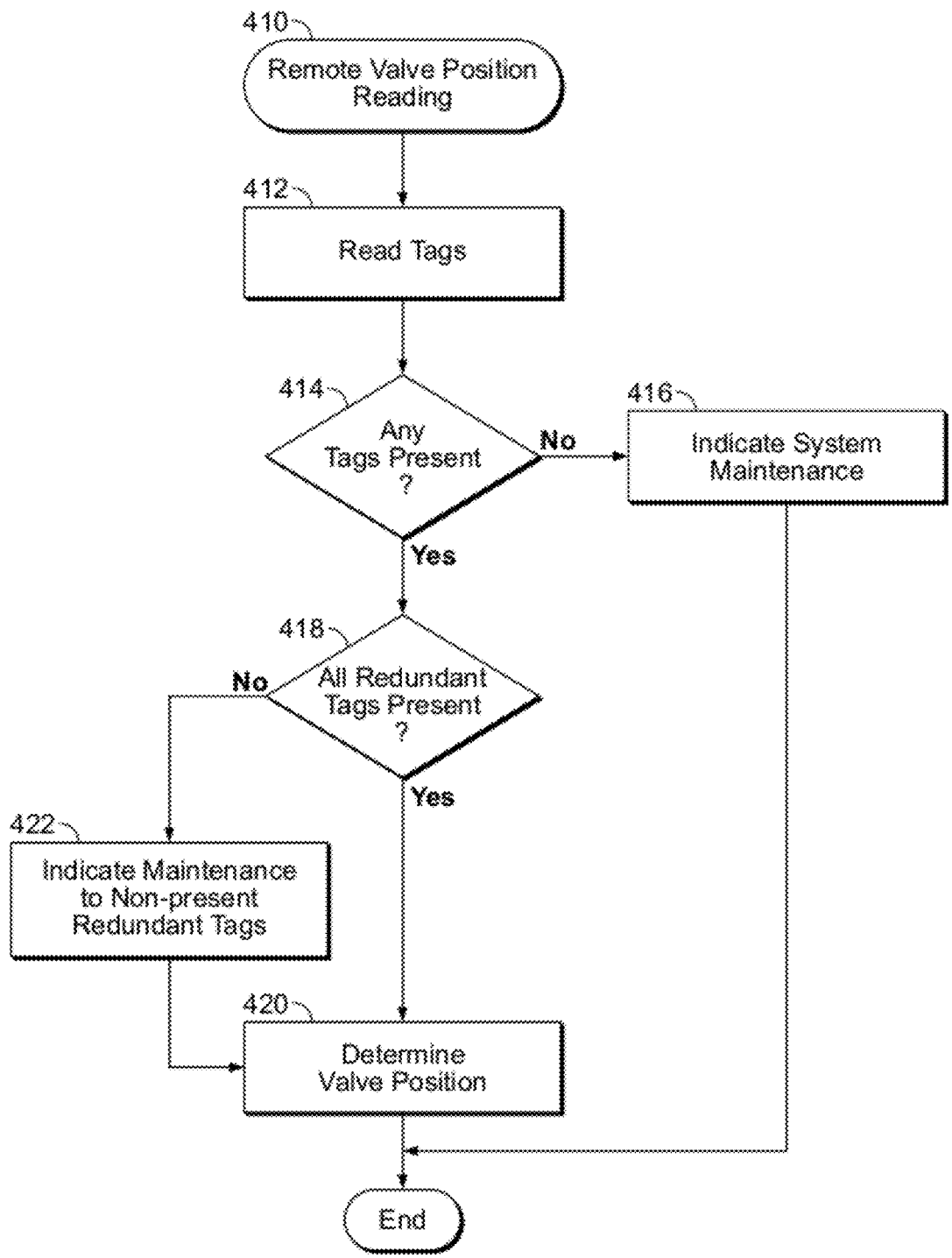
FIG. 4 is depicts a flowchart of an example method that may be used to implement the example system of FIG. 3.
Figure 5:
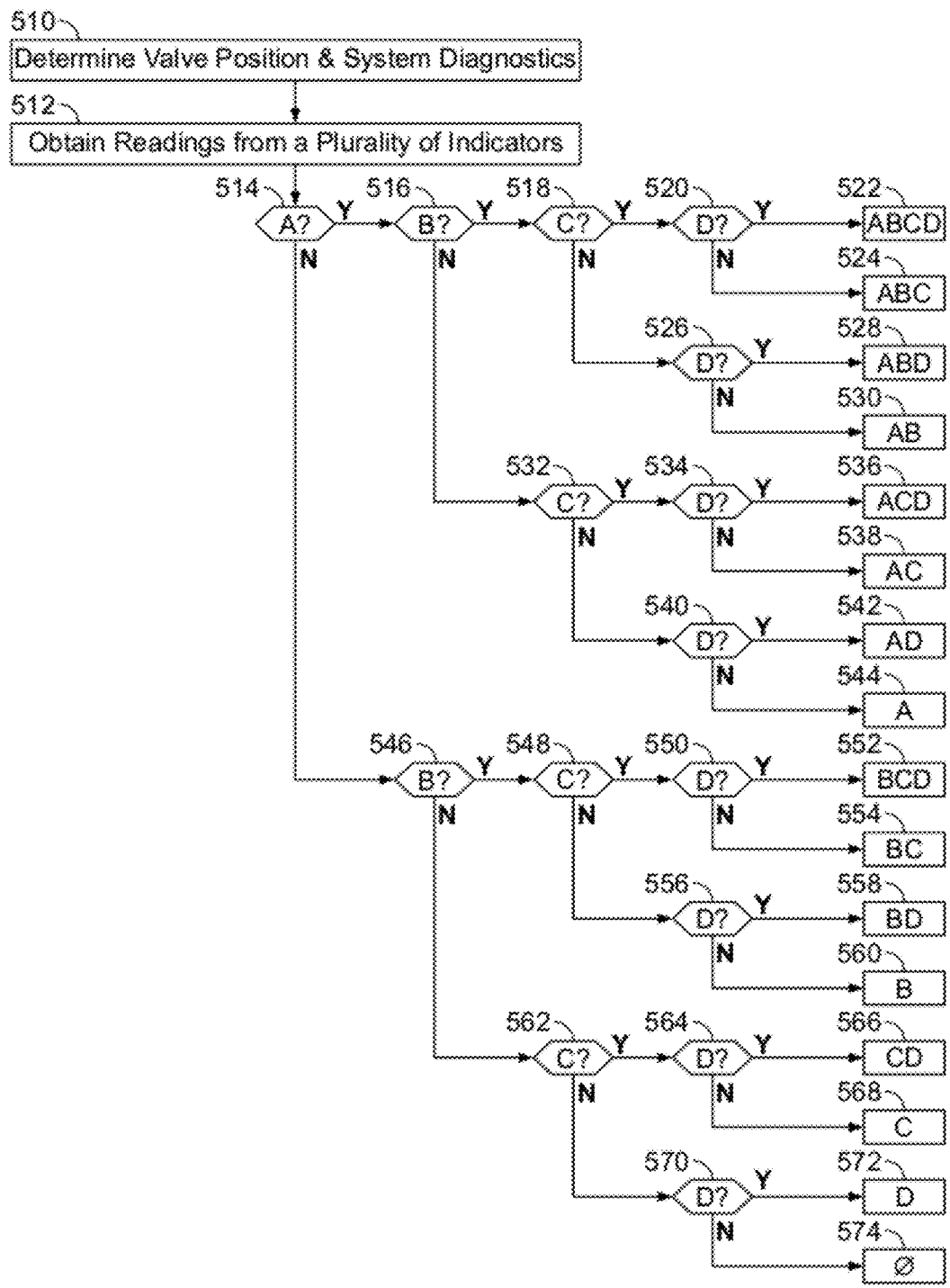
FIG. 5 is a flowchart depicting a more detailed representation of an example method that may be used to implement the example system of FIG. 3.

Flowcharts representative of example processes that may be used to implement the system 310 of FIG. 3 are shown in FIGS. 4 and 5. In this example, the example processes comprise a program for execution by a processor such as the processor 324 shown in FIG. 3. The program may be embodied in software stored on a tangible medium such as a CD-ROM, a floppy disk, a hard drive, a digital versatile disk (DVD), or a memory (e.g., the memory 326) associated with the processor 324, but the entire program and/or parts thereof could alternatively be executed by a device other than the processor 324 and/or embodied in firmware or dedicated hardware in a well-known manner. For example, any or all of the example indicator 312, the example signal generator 314, the example transponder 316, the example communication channel 320, the example reader 318, the example receiver 322, the example processor 324, the example memory 326, the example display 328, the example navigation unit 330, the example alert unit 332 and/or, more generally, the example system 310, etc. could be implemented by software, hardware, and/or firmware. Further, although the example program is described with reference to the flowcharts illustrated in FIGS. 4 and 5, many other methods of implementing the example system 310 may alternatively be used. For example, the order of execution of the blocks may be changed, and/or some of the blocks described may be changed, eliminated, or combined.

Turning in detail to FIGS. 4 and 5, the example methods of FIGS. 4 and 5 are described in connection with the example position indicator 112 and identifier devices 118, 120, 126 and 128 of FIGS. 1 and 2, the indicator 312 of FIG. 3, the example reader of FIG. 3, and the example position indication system 310 if FIG. 3. However, the example methods of FIGS. 4 and 5 may be more generally applied to implement any other valve position indicator(s). The flowcharts of FIGS. 4 and 5 are used to describe how the example position indication system 310 obtains information and processes information regarding a valve position and system diagnostics.

FIG. 4 illustrates an example remote valve position reading process 410. In the example process 410, an operator or other person reads tags (block 412), which may be, for example, the identifier devices 118, 120, 126 and 128 of FIGS. 1 and 2 and/or the indicator(s) 312 of FIG. 3. The tags may be read with a handheld reading device such as, for example, the reader 318 of FIG. 3. The example process 410 then determines if any tags are present (block 414). For example, the processor 324 of the reader 318 of FIG. 3 may determine if signals (e.g., including unique identifier codes) from any of the indicator(s) 312 have been received by the receiver 322. If no tags are present but should be, the example system 310 indicates that system maintenance is needed (block 416). If no tags are present, all of the tags may need to be serviced. Alternatively, if no tags are present, the operator may not have the reader 318 oriented in the correct direction toward a valve position indicator in the valve being monitored or inspected. If the reader 318 is not oriented correctly, the navigation unit 330 and alert unit 332 may cooperate to alert the operator, and the example process 410 may provide an 'improper orientation' indicator in place of the system maintenance indicator of block 416.

If one or more tags are present, the example process 410 determines if all of the redundant tags (e.g. the identifier devices 120 and 128 or FIGS. 1 and 2) are present (block 418). To determine if all of the redundant tags are present, the example processor 324 of the reader 318 determines if signals from the redundant indicator(s) 312 (e.g., identifier devices 120 and 128) have been received by the receiver 322. If all of the redundant tags are present, then no maintenance is needed and the example process 410 determines the position of the valve (block 420). For example, if the identifier devices 118 and 126 and their redundant identifier devices 120 and 128 of FIGS. 1 and 2 are determined to be present, then the example process 410 determines that the valve position is open. If only the identifier device 126 in the second set of identifier devices 124 and its redundant identifier device 128 are determined to be present, then the example process 410 determines that the valve position is closed. In this position, the identifier device 118 of the first set of identifier devices 116 and its redundant identifier device 120 are shielded behind the shielding body 130 and, thus, are unreadable and unable to convey information (e.g., unique identifier codes) indicating their presence.

If all of the redundant tags are not present (block 418), then the example process 410 indicates that maintenance is required for the non-present redundant tags (block 422) and determines the valve position (block 420). The various combinations of present and/or absent tags and redundant tags are discussed below in greater detail with respect to FIG. 5.

Turning now to FIG. 5, an example valve position and system diagnostics process 510 includes using a reader (e.g., the example reader 318 of FIG. 3) to obtain readings from a plurality of tags, indicators or identifier devices (block 512), which may be the example indicators 312 of FIG. 3 and/or, more particularly, one or more of the example identifier devices 118, 120, 126 and 128 of FIGS. 1 and 2.

The example process 510 determines if a reading is received from a first identifier device (e.g., the first identifier device 118) (block 514). The reading, as noted above may be a unique identifier code or any other type of signal, energy or occurrence that can be detected by a human and/or a machine and which can be used to identify the presence of a particular tag on a particular valve in a particular location on the valve. In this example, a reading from a first identifier device is denoted by the symbol 'A'. Similarly, readings from second, third, and fourth identifier devices are represented by 'B,' 'C' and 'D,' respectively. If a reading from the first identifier device has been obtained, the example process 510 determines if a reading from a second identifier device (e.g., the second identifier device 120) has been obtained (block 516). If a reading from the second identifier device has been obtained, the example process 510 determines if a reading from a third identifier device (e.g., the third identifier device 126 has been obtained) (block 518). If a reading from the third identifier device has been obtained, the example process 510 determines if a reading from a fourth identifier device (e.g., the fourth identifier device 128) has been obtained (block 520). If a reading from the fourth identifier device has been obtained, the example process 510 outputs 'ABCD' (block 522), and if a reading from the fourth identifier device has not been obtained, the example process 510 outputs 'ABC' (block 524).

Returning to block 518, if a reading from the third identifier device has not been obtained, the example process 510 determines if a reading from the fourth identifier device has been obtained (block 526). If a reading from the fourth identifier device has been obtained, the example process 510 outputs 'ABD' (block 528), and if a reading from the fourth identifier device has not been obtained, the example process 510 outputs 'AB' (block 530).

Returning to block 516, if a reading from the second identifier device has not been obtained, the example process 510 determines if a reading from the third identifier device has been obtained (block 532). If a reading from the third identifier device has been obtained, the example process 510 determines if a reading from the fourth identifier device has been obtained (block 534). If a reading from the fourth identifier device has been obtained, the example process 510 outputs 'ACD' (block 536), and if a reading from the fourth identifier device has not been obtained, the example process 510 outputs 'AC' (block 538).

Returning to block 532, if a reading from the third identifier device has not been obtained, the example process 510 determines if a reading from the fourth identifier device has been obtained (block 540). If a reading from the fourth identifier device has been obtained, the example process 510 outputs 'AD' (block 542), and if a reading from the fourth identifier device has not been obtained, the example process 510 outputs 'A' (block 544).

Returning to block 514, if a reading from the first identifier device has not been obtained, the example process 510 determines if a reading from the second identifier device has been obtained (block 546). If a reading from the second identifier device has been obtained, the example process 510 determines if a reading from the third identifier device has been obtained (block 548). If a reading from the third identifier device has been obtained, the example process 510 determines if a reading from the fourth identifier device has been obtained (block 550). If a reading from the fourth identifier device has been obtained, the example process 510 outputs 'BCD' (block 552), and if a reading from the fourth identifier device has not been obtained, the example process 510 outputs 'BC' (block 554).

Returning to block 548, if a reading from the third identifier device has not been obtained, the example process 510 determines if a reading from the fourth identifier device has been obtained (block 556). If a reading from the fourth identifier device has been obtained, the example process 510 outputs 'BD' (block 558), and if a reading from the fourth identifier device has not been obtained, the example process 510 outputs 'B' (block 560).

Returning to block 546, if a reading from the second identifier device has not been obtained, the example process 510 determines if a reading from the third identifier device has been obtained (block 562). If a reading from the third identifier device has been obtained, the example process 510 determines if a reading from the fourth identifier device has been obtained (block 564). If a reading from the fourth identifier device has been obtained, the example process 510 outputs 'CD' (block 566), and if a reading from the fourth identifier device has not been obtained, the example process 510 outputs 'C' (block 568).

Returning to block 562, if a reading from the third identifier device has not been obtained, the example process 510 determines if a reading from the fourth identifier device has been obtained (block 570). If a reading from the fourth identifier device has been obtained, the example process 510 outputs 'D' (block 572), and if a reading from the fourth identifier device has not been obtained, the example process 510 outputs an error message such as, for example a null or empty set symbol 'Ø' (block 574). The example process 510 may then be restarted for the same or a different valve.

As noted above, one or more of the blocks shown in FIGS. 4 and/or 5 can be combined. Further, the determination of whether or not readings are obtained from one or more of the identifier devices may occur simultaneously or substantially simultaneously. In addition, though the example described with respect to FIG. 5 uses four identifier devices, any other number of identifier devices may also be implemented including, for example, one, two, three, five, six, etc.

In addition, the outputs shown in FIG. 5 are various combinations of 'A,' 'B,' 'C' and 'D.' However, in other examples, the outputs could be any other type of symbols, or codes, values, etc. Furthermore, the outputs may be words or text that immediately convey to the operator the state of the valve (i.e., open, closed, a percent open and/or the need for maintenance of one or more the identifier devices or related containers).

FIG. 6 illustrates a table that shows corresponding valve positions and diagnostic readings for the example outputs shown in FIG. 5. As shown in FIG. 6, where the output is 'ABCD' (block 522 of FIG. 5), the reader device 318 may display 'Open' and/or 'Ok' in reference to the position of the valve and the need or, in this case, lack of need for maintenance. An output of 'ACD' (block 536) or 'BCD' (block 552) indicates that the valve is open and that the stem container (e.g., the stem container 122 of FIG. 1) needs maintenance because the stem container 122 and/or one of the first identifier device 116 or the second identifier device 118 needs to be replaced, repaired, adjusted or otherwise serviced. Furthermore when the output is 'ABD' (block 528), 'ABC' (block 524) or 'AB' (block 530), the valve is open and the base container or shielding body (e.g., the shielding body 130 of FIG. 1) needs maintenance because the shielding body 130 and/or one of the third identifier device 126 or the second identifier device 128 needs to be replaced, repaired, adjusted or otherwise serviced. When the output is 'AD' (block 542), 'AC' (block 538), 'A' (block 544), 'BD' (block 558), 'BC' (block 554) or 'B' (block 560), the valve is open and both the stem container 122 and the shielding body 130 need maintenance. If the output reads 'CD' (block 566), the valve is closed and no maintenance is needed. A reading of 'C' (block 568) or 'D' (block 572) indicates that the valve is closed and the shielding body 130 needs maintenance. An output of an error message such as, for example a null or empty set symbol 'Ø' (block 574) means that maintenance is needed or that the reader device 318 has not been appropriately aimed at any identifier device.

Figure 7:
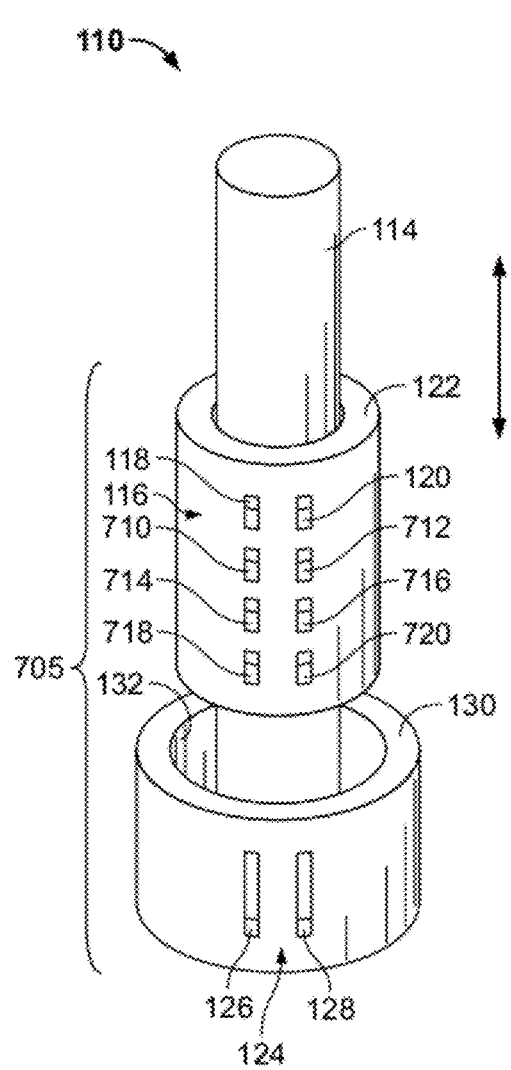
FIG. 7 depicts an alternative example valve position indicator configuration coupled to a valve in an open position.

FIG. 7 depicts an alternative example position indicator 705 coupled to the valve 110. In the example position indicator 705, the first set of identifier devices 116 includes fifth through tenth identifier devices 710, 712, 714, 716, 718 and 720. The first set of identifier devices 116 is a plurality of longitudinally displaced identifier devices that are shown in this example as pairs. However, in other examples, any number or configuration of identifier devices may include rows of one, three, etc. FIG. 7 shows the valve 110 in an open position for which the presence of each of the identifier devices 118, 120, 710, 712, 714, 716, 718 and 720 coupled to the stem container 122 is detectable.

Figure 8:
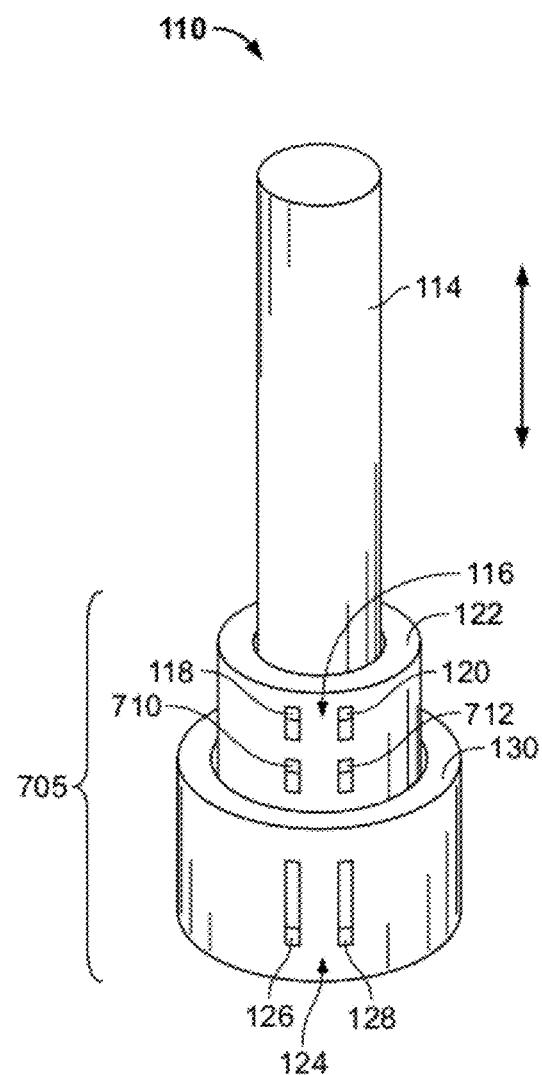
FIG. 8 depicts the example valve position indicator of FIG. 7 in a partially open position.

In FIG. 8, the valve 110 is a position that is intermediate the open position and a closed position. This partially open position is identified by reading the presence or absence of the identifier devices. Because only a portion of the plurality of identifier devices in the first set are readable, the operator is informed that the valve 110 is not fully closed. In the fully closed position, none of the identifier devices 118, 120, 710, 712, 714, 716, 718 and 720 coupled to the stem container 122 is readable (similar to the example shown in FIG. 2).

Alternatively, the example position indicator 705 of FIGS. 7 and 8 may include only a single row wireless identifier device(s) coupled to the valve stem 114. However, though a row is described in this example, any orientation or pattern of wireless identifier device(s) may be used. In this example, there may be one, two, three, or any number of wireless identifier device(s) 118, 710, 714 and 718, each of which has a value (e.g., a stroke or open percentage) associated therewith. For example, identifier devices 118, 710, 714 and 718 may have the values 0, 25, 50 and 100 respectively associated therewith, which are literal indications of the position of the valve as a percentage (i.e., 0, 25, 50 and 100 mean fully closed, a fourth open, half open and fully open, respectively). Likewise, any other values may be used including, for example, 33, 67, etc. Further, in yet other examples, the values may be variables that indirectly indicate the position of the valve. For example, the values may be an 'X' to signify the presence of an identifier device and a number of 'X's correlates to a valve position, while a different number of 'X's correlates to a different valve position. The position of the valve additionally or alternatively may indicate the operator the operational state of the valve and/or the need, or lack of need, for service.

A remote wireless electronic reader (e.g., the reader 318 of FIG. 3) may use, for example, near field communication protocols and/or a narrow focus antenna to transmit a narrow excitation field to activate one or more of the identifier devices. A signal such as, for example, an encoded signal is received at the reader from the identifier device(s). The value (s) are indicative of the position of the valve. In some examples, a person may aim the reader (i.e., the narrow excitation field) at a position (e.g., at a wireless identification device) on the valve (e.g., a long-stroke valve) to obtain a single reading from the wireless identification device indicative of the position of the valve. In other examples, the person may obtain readings from multiple identifier devices, and the operator can determine the position of the valve by, for example, using the largest of the received values. In addition, the reader may include a direction positioning guide (e.g. a light, laser, etc.) to assist the operator in directing the reader toward a particular wireless identification device. FIGS. 9 and 10 show another example in which a valve 910 is a rotary valve (as opposed, for example, to the sliding stem valve 110 described above with respect to FIGS. 1, 2, 7 and 8) that opens and closes by rotating a shaft 912 about a longitudinal axis of the valve shaft 912 in the directions of the arrows shown in FIGS. 9 and 10. In this example, a valve position indicator 914 includes a first set of tags or identifier devices 916 that includes a first tag or identifier device 918 and a second tag or identifier device 920, both of which are coupled to the valve shaft 912. In this example, the first set of identifier devices 916 is coupled directly to the valve shaft 912. In other examples, the first set of identifier devices 916 may be coupled directly to the valve shaft 912 via a shaft container (not shown), which may be similar to the stem container 122 described above. The example position indicator 914 also includes a second set of identifier devices 922 that includes a third identifier device 924 and a fourth identifier device 926. The second set of identifier devices 922 is coupled to a base container or shielding body 928. In this example, the identifier devices 918, 920, 924 and 926 are similar to the identifier devices 118, 120, 126 and 128 discussed above. Likewise, the shielding body 928 is similar to the shielding body 130 discussed above, except as noted herein. For example the shielding body 928 includes a shield or has a shielding device coupled to at least a portion of its inner diameter 930 to prevent reading or otherwise obtaining information from or communicating with the first set of identifier devices 916.

In the alternative position indicator 914 shown in FIGS. 9 and 10, the shielding body 928 has a window or opening 932. As shown in FIG. 9, the first set of identifier devices 916 is opposite (i.e., aligned) with the opening 932. In this position, each of the identifier devices 918, 920, 924 and 926 is readable and, as noted above, the valve 910 is open and the identifier devices 918, 920, 924 and 926 and/or the shielding body 928 do not need maintenance.

When the valve shaft 912 rotates, the first set of identifier devices 916 rotates with the valve shaft 912 and, as shown in FIG. 10, the first set of identifier devices 916 moves out of alignment with the window 932. In this configuration, the first set of identifier devices 916 is disposed behind the shield 930 of the shielding body 928 and, thus, is not readable. Only the second set of identifier devices 922 is readable, which indicates that that valve 910 is in the closed position. In other examples, the identifier devices 918 and 920 may be reversed so that the presence of the first set of identifier devices 916 indicates that the valve 910 is closed. Furthermore, while the window or opening 932 is shown as an aperture in the shielding body 928 in FIGS. 9 and 10, in other examples, the opening 910 may be an area of the shielding body 928 that is not coupled to the shield surface 930.

Figure 11:
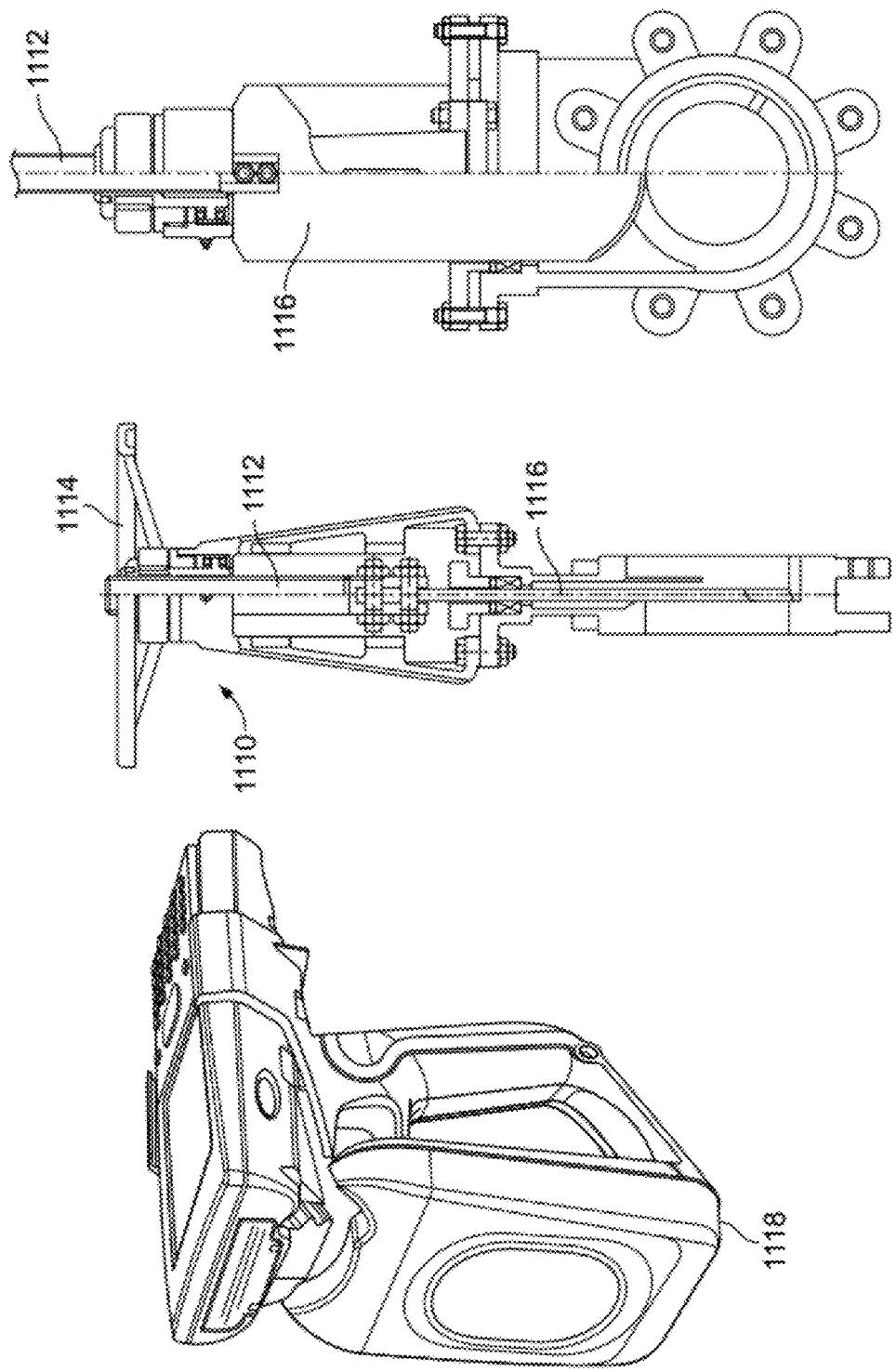
FIG. 11 is a partial cross-sectional and exploded view of an example valve including an example reader.

FIG. 11 shows a partial cross-sectional view and exploded view of a knife gate valve 1110 that includes a valve stem 1112 that is operably coupled to a handwheel 1114. The valve stem 1112 is coupled to a knife gate 1116, which is movable 1112 to open or close the valve 1110. Though not shown in FIG. 11, the example position indicators 112 discussed above may be incorporated into this example by coupling the indicators to the valve stem 1112 in the same manner as the indicators are coupled to the valve stem 114 of FIG. 1. Additionally, a shielding body similar to the shielding body 130 of the previous examples may also be included if desired.

FIG. 11 also shows an example reader 1118, which may be used by an operator to obtain information from any position indicators (e.g., the first and second sets of identifier devices 116 and 124 of the sliding valve of FIG. 1, the position indicator 914 of the rotary valve of FIG. 9, etc.) that may be included in this example. In this example, the reader 1118 includes an embedded receiver or transceiver such as, for example, an antenna to receive information from the identifier devices. The information from these identifier devices can be used to determine if the valve 1110 is open or closed and if maintenance is needed, as described above. The reader 1118 may be used in a multi-protocol environment and is designed to eliminate human intervention and line of sight restrictions in data collection applications. Further details about the reader 1118 are described above with respect to the system 310 of FIG. 3.

Figure 12:
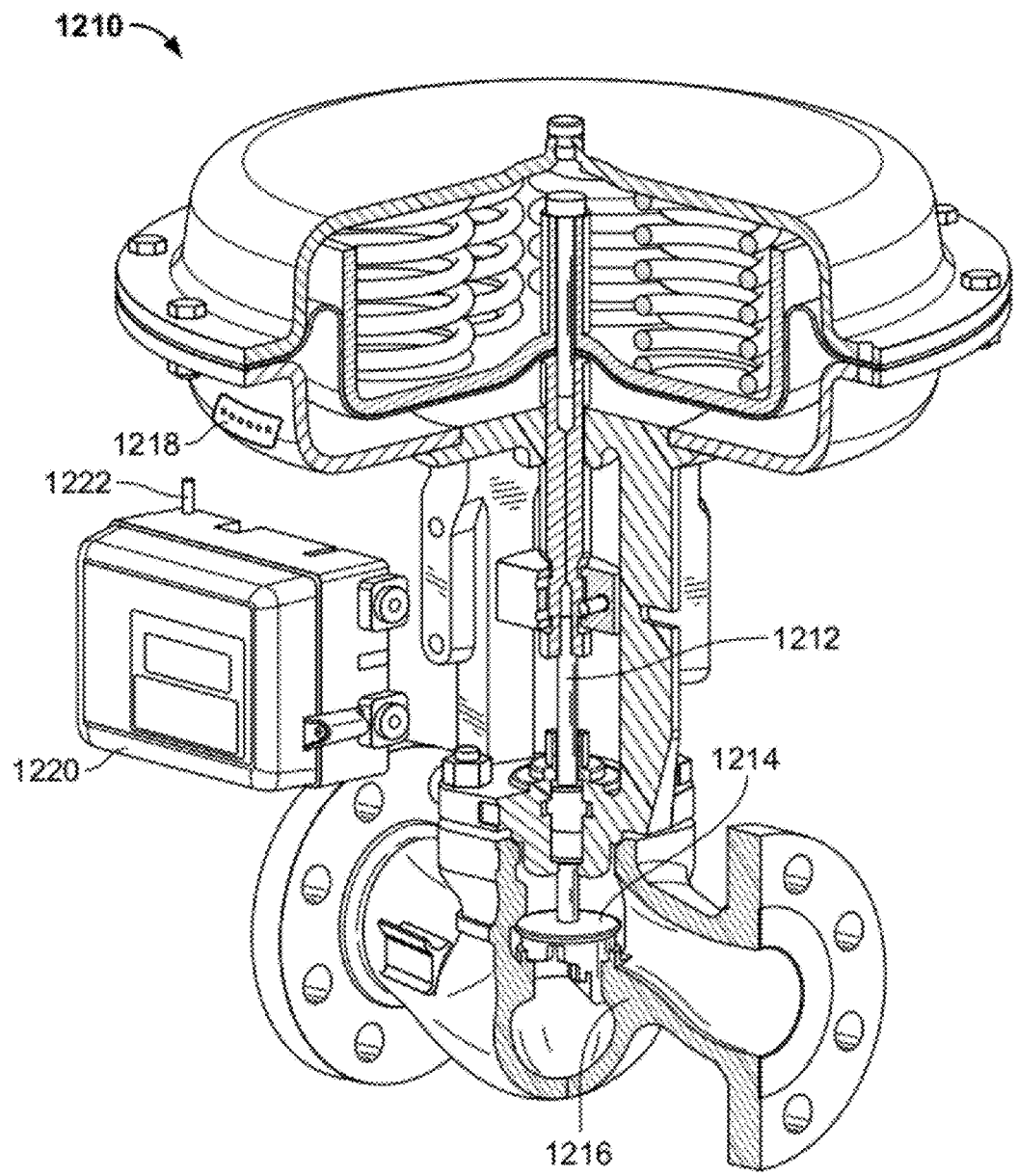
FIG. 12 is a partial cross-sectional view of an example valve including an example identification tag and an example positioner.

FIG. 12 shows a partial cross-sectional view showing the example valve stem 1212 in relation to other structure of the example valve 1210. As discussed above, the valve stem 1212 is coupled to a plug 1214 that engages a valve seat 1116 to open or close the valve 1210. Though not shown in FIG. 12, the example position indicators 112 discussed above may also be incorporated into this example. Also, the example valve 1210 shown in FIG. 12 includes an additional identifier device 1218. The additional identifier device 1218 contains identification information such as, for example, one or more of valve maintenance history, valve shipment information, installation information, valve make and model, recommended spare parts, contact information or maintenance procedures.

FIG. 12 also shows an example positioner 1220 that may include an embedded or integrated reader or other RFID capabilities, which may be used by an operator to obtain information from the additional identifier device 1218. In this example, the reader in the positioner 1220 may include a receiver or antenna 1222 to receive information from the additional identifier device 1218. In other examples, the positioner 1220 may include any other suitable receiver device to receive and/or read information from the additional identifier device 1218. Traditionally, identification information was manually entered by an operator. Expedient and automatic reading of the additional identification information reduces assembly, evaluation, testing and maintenance time of the valves. Furthermore, in other examples the reader of the positioner 1220 may read information from, for example, the first and second identifier devices 116 and 124 of FIG. 1. The information from these identifier devices can be used to determine if the valve 1210 is open or closed and if maintenance is needed, as described above. In this example, the reader of the positioner 1220 may additionally or alternatively communicate through a field bus network to, for example, field devices, a controller or other devices coupled to the network.

In addition, in some examples, coded (e.g., color coded) devices may be used for any of the components described herein (e.g., the stem container 122 and/or the shielding body 130) to further enhance a manual and visibility check of the components. In addition, while the examples described herein detail the use of the position indicators to determine the position of a valve, the example position indicators described herein can be more generally applied to other devices that have moving components that have discrete positions including, for example, switches and/or breakers. Furthermore, the examples described herein may be combined in whole or in part in manually and/or automatically controlled sliding, rotary, and/or other valves.

In addition, the example valve position indicators described herein may be used to indicate the valve position as a redundant operation to a position feedback operation in an automatically controlled valve. For example, a valve that includes potentiometers or other sensor or position indicators that automatically determine the position of the valve may send signals to a reader (e.g., the reader 1118 of FIG. 11) that include information related to the position of the valve. In addition, the reader may independently gather information related to the position of the valve in accordance with any of the wireless identifier examples described herein. The information gathered by the reader and the information transmitted by the automatic position sensors may be displayed (e.g., simultaneously) at the reader for comparison by the operator. If the information corresponds or substantially corresponds, the operator can verify the position and/or proper operation of the valve with relatively high confidence. If the information does not correspond, maintenance, replacement or other service of the valve and/or the position indicator(s) may be needed.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. An apparatus, comprising:
a valve body;
a valve stem to linearly move between a first position and a second position to control fluid flow through the valve body; and
a valve position indicator, comprising:
a wireless identifier device fixed to a stem container through which the valve stem passes, the stem container fixed to the stem, the wireless identifier device to move with the valve stem, wherein the wireless identifier device is to convey information indicative of the position of the valve stem to a remote wireless electronic reader; and
a shielding body to prevent the wireless identifier device from conveying the information to the remote wireless electronic reader when the valve stem is in the first position and to enable the wireless identifier device to convey the information to the remote wireless electronic reader when the valve stem is in the second position.

2. The apparatus of claim 1, further comprising a plurality of wireless identifiers coupled to the valve stem.

3. The apparatus of claim 2, wherein at least one of the plurality of wireless identifiers is redundant relative to another one of the plurality of wireless identifiers.

4. The apparatus of claim 2, further comprising another wireless identifier separate from the plurality of wireless identifiers, wherein the other wireless identifier is not coupled to the stem and is to convey further information to the remote wireless reader regardless of the position of the valve stem.

5. The apparatus of claim 2, wherein at least one of the plurality of wireless identifiers is arranged on the valve stem to convey information indicative of a position of the valve stem between a fully open position and a fully closed position to the remote wireless electronic reader.

6. The apparatus of claim 1, wherein the shielding body comprises a material that substantially blocks the transmission of electromagnetic signals from the wireless identifier to the remote wireless reader.

7. The apparatus of claim 1, wherein the shielding body comprises an opening to enable the wireless identifier device to convey information through the shielding body to the remote wireless reader when the wireless identifier device is opposite the opening.

8. The apparatus of claim 1, further comprising a fluid flow control apparatus coupled to the valve stem to control fluid flow through a flow aperture of the valve body, wherein the fluid flow control apparatus is longitudinally displaceable to control fluid flow through the flow aperture.

9. The apparatus of claim 1, wherein the stem container is fixed relative to the valve stem as the valve stem moves.

10. An apparatus, comprising:
a valve body;
a valve stem; and
a valve position indicator, comprising:
a wireless identifier device directly coupled to the valve stem to move with the valve stem, wherein the wireless identifier device is to convey information indicative of the position of the valve stem to a remote wireless electronic reader; and
a shielding body to prevent the wireless identifier device from conveying the information to the remote wireless electronic reader when the valve stem is in a first position and to enable the wireless identifier device to convey the information to the remote wireless electronic reader when the valve stem is in a second position.

11. The apparatus of claim 10, further comprising a fluid flow control apparatus coupled to the valve stem to control fluid flow through a flow aperture of the valve body, wherein the fluid flow control apparatus is longitudinally displaceable to control fluid flow through the flow aperture.

12. The apparatus of claim 10, further comprising a fluid flow control apparatus coupled to the valve stem to control fluid flow through a flow aperture of the valve body, wherein the fluid flow control apparatus is rotationally displaceable to control fluid flow through the flow aperture.

13. The apparatus of claim 10, wherein the shielding body comprises an opening to enable the wireless identifier to convey information from an interior of the shielding body to an exterior of the shielding body when the wireless identifier is at least partially aligned with the opening.

14. The apparatus of claim 10, further comprising a plurality of wireless identifiers coupled to the valve stem, wherein at least one of the plurality of wireless identifiers is arranged on the valve stem to convey information indicative of a position of the valve stem between a fully open position and a fully closed position to the remote wireless electronic reader.

15. An apparatus, comprising:
a valve body;

a valve stem;
a fluid flow control apparatus coupled to the valve stem, the fluid flow control apparatus displaceable between a first position and a second position to control fluid flow through a flow aperture of the valve body; and
a wireless identifier fixed to the valve stem, the wireless identifier to provide a first value associated with a first position of the fluid flow control apparatus and to provide a second value associated with a second position of the fluid flow control apparatus.

16. The apparatus of claim 15, wherein the fluid flow control apparatus is rotationally displaceable to control fluid flow through the flow aperture.

17. The apparatus of claim 15, wherein the wireless identifier comprises a first wireless identifier, further comprising a plurality of wireless identifiers coupled to the valve stem.

18. The apparatus of claim 17, wherein at least one of the plurality of wireless identifiers is redundant relative to another one of the plurality of wireless identifiers, wherein a failure or non-readability of one of the redundant wireless identifiers is to provide a review or maintenance notification.

19. The apparatus of claim 17, wherein, in the first position, a first number of the wireless identifiers is readable by an electronic reader, in the second position, a second number of the wireless identifiers is readable by the electronic reader, the first position associated with a fully closed position and the second position associated with a fully open position.

20. The apparatus of claim 19, wherein, in a third position, a third number of the wireless identifiers is readable by the electronic reader, the third position associated with an intermediate position between the first and second positions.

21. The apparatus of claim 15, wherein the fluid flow control apparatus is longitudinally displaceable to control fluid flow through the flow aperture.

22. The apparatus of claim 15, wherein the wireless identifier is directly coupled to the valve stem.

23. The apparatus of claim 15, further comprising a valve position indicator to which the wireless identifier is coupled.

24. The apparatus of claim 15, further comprising a stem container to which the wireless identifier is coupled, wherein the valve stem extends through and is fixed to the stem container.

25. The apparatus of claim 24, wherein the wireless identifier is disposed on an exterior surface of the stem container.

* * * * *